United States Patent [19]

Hart et al.

[11] Patent Number: 4,830,438
[45] Date of Patent: May 16, 1989

[54] FREIGHT BRAKE EMERGENCY VALVE

[75] Inventors: James E. Hart, Trafford; Edward W. Gaughan, Irwin, both of Pa.

[73] Assignee: American Standard Inc., Wilmerding, Pa.

[21] Appl. No.: 233,083

[22] Filed: Aug. 17, 1988

[51] Int. Cl.⁴ .................... B60T 15/42; B60T 15/30
[52] U.S. Cl. ........................... 303/38; 303/33; 303/37; 303/82; 303/69
[58] Field of Search .................. 303/33–39, 303/68–69, 82, 41, 42, 43, 44, 45, 86

[56] References Cited

U.S. PATENT DOCUMENTS

| Re. 31,059 | 10/1982 | Hart | 303/38 |
| 4,106,819 | 8/1978 | Hart | 303/82 X |
| 4,113,319 | 9/1978 | Zoric | 303/37 |
| 4,125,293 | 11/1978 | Hart | 303/37 |
| 4,690,463 | 9/1987 | Hart | 303/33 X |
| 4,744,609 | 5/1988 | Weber, Jr. | 303/37 |
| 4,770,472 | 9/1988 | Weber, Jr. et al. | 303/33 |
| 4,776,642 | 10/1988 | Hart et al. | 303/37 |
| 4,783,124 | 11/1988 | Gaughan et al. | 303/37 |

OTHER PUBLICATIONS

"AB" Single Capacity Freight Car Air Brake Equipment with The "ABD", Control Valve, Sep. 1979, WABCO, 5062-16.

AB Single Capacity Freight Car Air Brake Equipment with The "ABDW", Control Valve, Nov. 1980, WABCO, 5062-18.

Primary Examiner—Douglas C. Butler
Attorney, Agent, or Firm—G. J. Falce

[57] ABSTRACT

An improved freight brake emergency valve providing improved stability against undesired emergency brake applications without degradation of emergency sensitiveity by increasing the "breathing" range of travel of the emergency piston to allow a momentary random brake pipe pressure fluctuation to dissipate, and by providing a volumetric chamber between the quick action chamber "breather" port connection at the slide valve/seat interface and the "breather" choke in order to obtain a momentary fast reduction of quick action chamber pressure to counteract a brake pipe pressure fluctuation during pressure equalization between the quick action chamber and the added volumetric chamber.

17 Claims, 3 Drawing Sheets

PRIOR ART

FREIGHT BRAKE EMERGENCY VALVE

BACKGROUND OF THE INVENTION

Undesired emergency brake applications have long been a source of concern to railroads. While many causes of undesired emergencies have been suggested, randomly occurring brake pipe pressure pulsations have now been identified as a contributing cause of undesired emergencies. These short term, relatively high rate pressure fluctuations seem to be due mainly to the dynamic effects of slack run-in and run-out during over-the-road train operation. Tests have shown that during this slack action, bending of the hose between cars can occur, which produces momentary volumetric changes in the brake pipe and consequent pressure pulses. In addition, the fact that the mass of air in the brake pipe obeys Newton's laws of motion, a general pressure drop of approximately 0.4 psi. has been measured at the rear of a train during slack run-ins, because the air in motion tends to remain in motion; and during slack run-outs, a general pressure rise has been measured at the rear of the train. The magnitude of these pressure fluctuations varies in proportion to the intensity of the slack action and other train parameters. When combined with quick service activity during service brake applications, these pressure fluctuations may generate a momentary localized brake pipe pressure reduction at an emergency rate or at a rate that so closely approaches an emergency rate that a particularly sensitive control valve will respond to trigger an undesired emergency brake application, as will hereinafter be explained.

The emergency piston in the well-known, industry standard ABD/ABDW control valves operates a slide valve that makes "breather" port connections through which quick action chamber pressure on one side of the emergency piston vents to atmosphere via a "breather" choke when the brake pipe pressure effective on the opposite side of the emergency piston is reduced. The "breather" choke is selected to establish a maximum rate at which the fixed volume quick action chamber pressure is capable of venting. By setting this rate in accordance with a threshold rate of reduction of brake pipe pressure, above which it is desired to trigger an emergency application, a pressure differential is prevented from developing across the emergency piston for a duration sufficient to force the emergency piston to emergency position during service rates of reduction of brake pipe pressure. Only when the reduction of brake pipe pressure exceeds such a threshold rate will it be sufficient to develop and sustain a pressure differential across the emergency piston, needed to force the emergency piston to emergency position.

Figure 1:
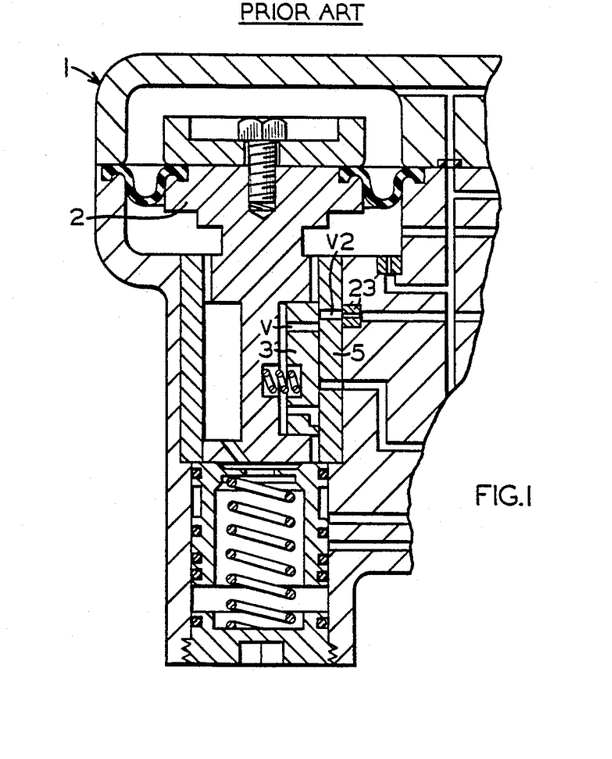
FIG. 1 shows a diagrammatic, sectional view of an emergency valve as employed in the emergency portion of the standard, ABD type freight brake control valve device.
Figure 2:
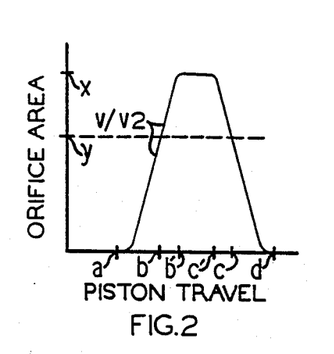
FIG. 2 is a graph illustrating the maximum "breathing" range of the "breathing" zone in which quick action chamber pressure is vented as a function of the emergency piston slide valve travel in the standard ABD control valve device.

In FIG. 1 is shown the emergency portion 1 of the standard ABD/ABDW control valve device having an emergency piston 2 that carries a slide valve 3 that, in turn, establishes the aforementioned "breather" connection between a port v in the slide valve with a port v2 in the slide valve bushing 5. The orifice area of this v/v2 porting connection initially increases as piston 2 moves from point (a) to point (b'), as shown in the graph of FIG. 2 and decreases as piston 2 moves from point (c') to point (d). Point Y on the graph of FIG. 2 represents the orifice area of the "breather" choke 23. It will be apparent from the graph that the effective orifice area of the v/v2 porting corresponds with the fixed orifice area of "breather" choke 23 when piston travel reaches point (b), being less than the orifice area of "breather" choke 23 between points (a) and (b) and greater between points (b) and (c). In the range of piston travel between points (b) and (c), "breather" choke 23 is effective in conjunction with the v/v2 orifice area to limit the aforementioned maximum rate at which the quick action chamber pressure can vent or "breath", this range of travel being commonly referred to as a maximum "breathing" range.

During piston movement beyond point (c') to point (d), the area of the v/v2 porting interface diminishes as port v moves out of communication with port v2, until at point (d) complete cut-off of the venting or "breathing" of quick action chamber pressure occurs. This range of travel of the emergency piston between points (a) and (d) is generally referred to as the "breathing" zone and lies intermediate release position and emergency position of the emergency piston. The piston travel in this "breathing" zone is nominally, 0.077 inch.

It will be appreciated that since the orifice areas of the v/v2 port connection and "breather" choke 23 are in series between the quick action chamber and atmosphere, the venting or "breathing" of quick action chamber pressure is nearly always influenced by this restriction of both orifices. It will be appreciated, therefore, that the actual "breathing" rate of quick action chamber pressure only approximates the curve of FIG. 2.

Movement of emergency piston 2 into the service zone, in response to a pressure differential created by a reduction in brake pipe pressure relative to quick action chamber pressure acting on opposite sides of piston 2, is intended to vent quick action chamber pressure at a "breathing" rate sufficient to counteract the reduction of brake pipe pressure and thereby reverse the pressure differential initiating piston movement to accordingly stabilize the emergency piston, provided the reduction of brake pipe pressure is at a service rate. If the service reduction of brake pipe pressure is at the maximum service rate, the emergency piston will find a position generally in the maximum "breathing" range between points (b) and (c), in which the resultant venting of quick action chamber pressure will counteract the reduction of brake pipe pressure and thereby stabilize the emergency piston. On the other hand, brake pipe pressure reductions at less than the maximum service rate will create a lower initial pressure differential to govern movement of the emergency piston, and the emergency piston will accordingly find a position in the "breathing" zone between points (a) and (b), where the quick action chamber pressure is vented at a less than maximum "breathing" rate, depending upon the degree of v/v2 interface opening. During this stabilization of the emergency piston during service brake applications, it will be understood that the service piston may cycle within the "breathing" zone until it finds the proper position in which the "breathing" of the quick action chamber pressure balances the brake pipe pressure reduction sufficiently to stabilize the piston. It will also be understood that in the event the emergency piston moves beyond position (c), the v/v2 interface opening begins to gradually close, as port v in the slide valve moves past port v2 in the slide valve bushing seat, thereby tending to decrease the venting of quick action chamber pressure. Accordingly, the pressure differential across the emergency piston effecting its movement may not be reversed, but rather may increase due to the decreased rate of quick action chamber venting, thereby forcing the emergency piston to emergency position, wherein the emergency piston slide valve establishes a port connection to initiate the emergency brake application function. While this is a normal required function in response to a true emergency rate of reduction of brake pipe pressure, it is also believed to occur in response to the above discussed random fluctuations of brake pipe pressure during service brake applications to cause unintended emergency brake applications, as hereinafter explained.

The force of the pressure differential required to overcome static friction and initiate movement of the emergency piston from release position to the "breathing" zone is greater than the force required to overcome dynamic friction and maintain continued movement of the piston. The piston momentum, if excessive, due to this initial high differential force and an extremely fast initial rate of brake pipe pressure reduction, can tend to drive the piston beyond the maximum "breathing" range between points (b) and (c), thus aggravating the situation in which a random brake pipe pressure fluctuation occurs. Normally, piston movement will be halted in the "breathing" zone between points (a) and (c) and will hunt or cycle to find the precise position in which the quick action chamber pressure will "breathe" at a rate corresponding to the effective service reduction of brake pipe pressure at that particular valve, thereby stabilizing the piston against further movement beyond point (c). However, if a random brake pipe pressure fluctuation should occur prior to piston movement being halted, the piston momentum coupled with the momentary high pressure differential acting on the piston, due to the pressure fluctuation, can cause the piston to overshoot the maximum "breathing" range (b-c) within the "breathing" zone, before the pressure fluctuation dissipates. The resultant movement of the emergency piston beyond point (c), defining the limit of the maximum "breathing" range, results in progressively reduced "breathing" of quick action chamber pressure, due to reduced orifice area of the v/v2 porting, with consequent loss of the emergency piston stability. When this occurs, the emergency piston will continue to move to emergency position, producing an unintended emergency brake application.

One way of solving this problem would be to decrease the overall emergency piston sensitivity, but this could severely jeopardize the propagation of emergency brake applications, particularly where successive cars are hauled in a train with inoperative control valves and no other means to effect a local emergency venting of brake pipe pressure in response to an emergency brake application.

OBJECTS OF THE INVENTION

It is therefore the principal object of the present invention to increase the emergency piston stability during service brake applications, without significant loss of emergency responsiveness;

An extension of the principal objective is to maximize the "breathing" range of travel of the emergency piston sufficient to counteract a spurious fluctuation of brake pipe pressure during a service brake application to prevent inadvertent movement of the piston to emergency position;

Another extension of the principal objective is to effect, when needed, an initial short term and carefully limited reduction of quick action chamber pressure at a rate that is greater than the rate of reduction that can be achieved via the "breather" choke; and Another object of the invention is to increase the capacity of the "breather" port connection at the slide valve/seat interface to improve the rate at which the short term reduction of quick action chamber pressure achieved by the foregoing objective occurs.

SUMMARY OF THE INVENTION

Briefly, the objective of the invention is achieved in one aspect by increasing the width of the slot in the emergency piston slide valve, or alternatively the slide valve seat, or by increasing the width of both of these slots, thereby increasing the degree of piston travel during which the quick action chamber "breathing" function occurs. By extending the "breathing" zone of piston travel in this manner, more time is provided to allow a momentary brake pipe fluctuation that occurs during a service brake application to dissipate without causing the emergency piston to be inadvertently forced beyond the maximum "breathing" range and consequently into emergency position.

In another aspect of the invention, a volumetric chamber is provided between the "breather" choke and the emergency piston slide valve/seat, so that during movement of the emergency piston into the "breathing" zone, pressure equalization occurs between air at atmospheric pressure in this volumetric chamber and the quick action chamber pressure effective on one side of the emergency piston. Due to the fact that the "breather" choke is located downstream of this volumetric chamber, this equalization of pressure effects a limited duration, but high rate of reduction of the quick action chamber pressure acting on the emergency piston to counteract such momentary, random brake pipe pressure reductions that might otherwise cause undesired movement of the emergency piston to emergency position during service brake applications.

BRIEF EXPLANATION OF THE DRAWINGS

These and other objects and advantages of the invention will become apparent from the following more detailed explanation when taken in conjunction with the accompanying drawings, in which.

DESCRIPTION AND OPERATION

Figures 3, 4, 5:
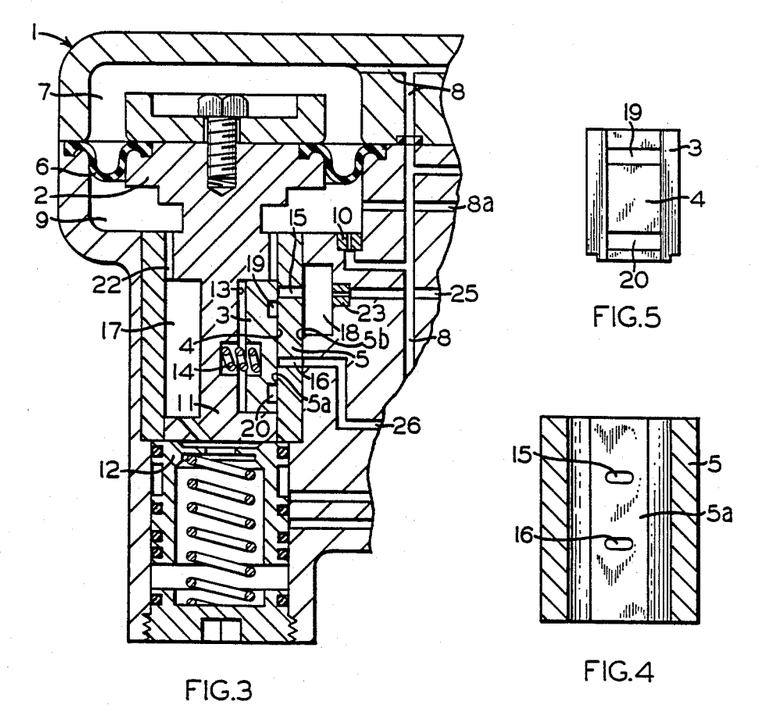
FIG. 3 is a diagrammatic, sectional view of an emergency valve similar to that of FIG. 1, but modified in accordance with the present invention.
FIG. 4 is a view showing the face of the slide valve seat of the emergency piston of FIG. 3.
FIG. 5 is a view showing the face of the slide valve of the emergency piston of FIG. 3.

Referring to FIG. 3 of the drawings, there is shown incorporated in the emergency portion 1 of a conventional freight brake control valve device, such as the ABD type manufactured by the Westinghouse Air Brake Division of American Standard Inc., an emergency piston 2 having a slide valve 3, the planar face 4 of which engages the conforming face 5a of a slide valve seat bushing 5. The outer periphery of bushing 5 may be tapered to provide a press fit in a bore 5b of the valve body. A diaphragm 6 of piston 2 forms with the valve body, a chamber 7 on one side, to which the compressed air carried in the trainline brake pipe (not shown) is connected via a brake pipe branch passage 8, and a chamber 9 on the opposite side subject to the compressed air in a quick action chamber (not shown). The quick action chamber pressure is charged from brake pipe branch passage 8 via a charging choke 10, chamber 9, and a passage 8a, so that during brake pipe charging, the pressure in chamber 7 is greater than the pressure in chamber 9, and the effective force due to this pressure differential acting across the area of the piston establishes and maintains the piston in its lowermost release position (as shown) until such time as the brake pipe pressure is reduced. This release position is determined by engagement of the emergency piston tail 11 with a spring-loaded spool valve 12 that provides the well-known emergency accelerated release function, which is not a part of the present invention.

The emergency piston slide valve 3 is housed within a recess 13 in the emergency piston, so as to move axially with the piston. A spring 14, between the slide valve 3 and the piston 2, urges the slide valve face 4 into engagement with the adjoining face 5a forming the slide valve seat in bushing 5 with sufficient force that the lapped interfaces therebetween provide a pressure seal between the porting in the slide valve and seat. As shown in FIG. 4, this porting is provided by grooves 15 and 16 that extend from face 5a completely through bushing 5, lying in a direction perpendicular to the direction of travel of piston 2. Cross-slots 19 and 20 are formed in the face 4 of slide valve 3 and extend laterally from side-to-side, as shown in FIG. 5. In extending entirely across the face of slide valve 3, these cross-slots 19 and 20 are communicated with quick action chamber air in recess 13.

A passage 22 is provided in piston 2 via which chamber 9 is communicated with the area 17 surrounding piston tail 11, this area 17 being also communicated with recess 13. Cross-slots 19 and 20 convey quick action chamber air from area 13 to the slide valve/seat interface.

In accordance with one aspect of the present invention, the width of one or the other, or both cross-slots 15 and 19 have been increased from the width of the corresponding slots in the standard emergency piston slide valve shown in FIG. 1. In this manner, the degree of piston travel in the maximum "breathing" range, during which the venting of quick action chamber air takes place, is significantly increased to obtain increased stability of the emergency piston, as will hereinafter be explained.

Figure 9:
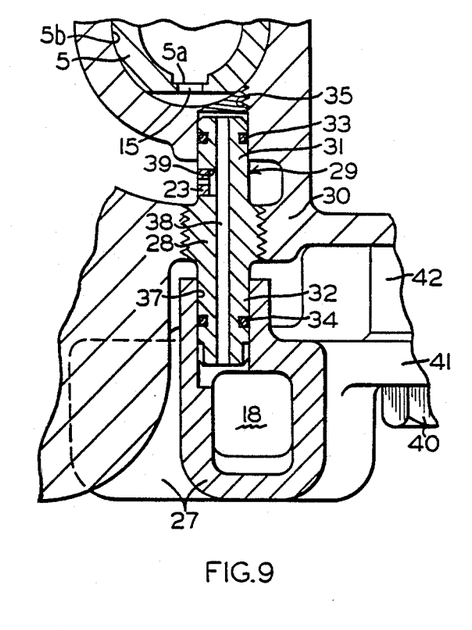
FIG. 9 is a view illustrating a modification of existing ABD control valves to incorporate the feature of the invention of FIG. 7.

In accordance with another aspect of the invention, a volumetric chamber 18 is provided either in the valve body, as shown in FIG. 3, or as an external reservoir, as shown in FIG. 9, in each instance being in communication with groove 15 in bushing 5. Chamber 18 is vented to atmosphere via an exhaust passage 25 in which is provided the quick action chamber "breather" choke 23.

Another passage 26 in the valve body communicates with groove 16 in slide valve seat 5a to conduct pilot air to well-known auxiliary valve devices (not shown). In providing volume 18 between "breather" choke 23 and groove 15 in bushing 5, improved stability of the emergency piston is obtained, as will be hereinafter explained.

Figure 6:
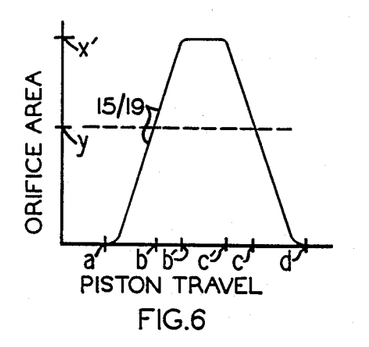
FIG. 6 is a graph similar to that of FIG. 2 illustrating the extended "breathing" range in which pressure is vented as a function of the emergency piston slide valve travel in accordance with one aspect of the present invention.

In release position of emergency piston 2, as shown in FIG. 3, slide valve 3 is positioned along seat 5a, so that cross-slots 19, 20 are out of registry with the respective grooves 15 and 16 in the slide valve bushing 5, thereby blanking quick action chamber pressure at the slide valve/seat interface. During a service brake application, pressurized air in chamber 7 is exhausted via brake pipe branch passage 8 and the train line brake pipe (not shown). Since the quick action chamber air in chamber 9 is connected to branch passage 8 via charging choke 10, a pressure differential is established across piston 2 to urge the piston in an upward direction toward emergency position. The upward force on piston 2, due to this pressure differential, is dependent upon the degree of service application desired. As the pressure differential force overcomes static friction, piston 2 moves upwardly into the "breathing" zone prior to reaching emergency position. In the "breathing" zone, cross-slot 19 in slide valve 3 registers with groove 15 in bushing 5, thereby establishing a connection at the slide valve/seat interface to vent quick action chamber air in chamber 9 via passage 22, area 17, recess 13, cross-slot 19, groove 15, chamber 18, choke 23, and exhaust passage 25. In this manner, "breathing" of quick action chamber pressure occurs throughout the range of piston travel between points (a) and (d) in the graph of FIG. 6 constituting the "breathing" zone. It will be appreciated, however, that during initial movement of the emergency piston 2 into the "breathing" zone, i.e., as the leading edge of cross-slot 19 gradually uncovers groove 15, the orifice area or "window" through which quick action chamber air flows or "breathes" to atmosphere progressively increases until groove 15 becomes fully uncovered. This progressive opening of the "breather" connection at the slide valve/seat interface is represented in the graph of FIG. 6 between points (a) and (b'). During piston travel between points (b') and (c'), groove 15 is fully uncovered so that the maximum orifice area, as represented by point X', is constant. As the trailing edge of cross-slot 19 begins to cover groove 15, with continued piston movement in the "breathing" zone beyond point (c'), the "breather" window, i.e., the orifice opening, becomes progressively smaller and is completely closed at point (d), which defines the limit of the "breathing" zone. The orifice area of choke 23 is less than the maximum orifice area of the interface connection or "window" between cross-slot 19 and groove 15, and thus is a contributing factor in establishing the maximum venting or "breathing" of quick action chamber air during the time piston 2 is between points (b) and (c).

From a comparison of the graphs of FIGS. 2 and 6, it will be seen that this piston travel between points (b) and (c) in the present invention corresponding to the maximum "breathing" range is greater than provided in the standard ABD type control valve, thus providing an extended range of piston travel before slide valve 3 begins to cut off quick action chamber "breathing" at point (c). This has the advantage of extending the range of maximum "breathing" activity between points (b) and (c), thus providing an extended distance that piston 2 can move in the maximum "breathing" range of the "breathing" zone to allow momentary, relatively high pressure differentials, due to random brake pipe pressure fluctuations, to dissipate before the piston travel has proceeded beyond point (c). Typically, these pressure fluctuations occur at an emergency rate for a relatively brief period of time during which 0-2 psi. reduction of brake pipe pressure occurs. In this manner, the service piston is assured of stopping in the extended maximum "breathing" range created between points (b) and (c), as shown in the graph of FIG. 6. By thus assuring that the emergency piston pauses in the maximum "breathing" range of the "breathing" zone, any sustained service reduction of brake pipe pressure effective on chamber 7 can be balanced by the venting of quick action chamber pressure effective in chamber 9 at a rate determined by the position the emergency piston finds between points (a) and (c). For example, a full service rate of brake pipe pressure reduction will result in piston 2 finding a position generally between points (b) and (c) in which maximum "breathing" of quick action chamber pressure occurs. At variable rates below full service rates, the piston will find a position between points (a) and (b) at which a corresponding reduced rate of quick action chamber pressure is obtained. Accordingly, emergency piston 2 is stabilized in the service zone during service braking without the aforementioned random brake pipe pressure fluctuations inadvertently forcing the piston to emergency position and thereby causing an undesired emergency brake application.

The aforementioned increase in the maximum "breathing" range of travel of piston 2 is achieved in one example of the present invention, as shown in FIG. 6, preferably by increasing the width of groove 15, i.e., the dimension of groove 15 in the direction of piston movement, as compared to the corresponding dimension of this groove in the slide valve of the standard ABD control valve. For example, the width dimension of this groove 15 in the arrangement of the present invention is nominally 0.055 inch, whereas in the standard ABD control valve, this same slot is nominally only 0.045 inch wide. It will be appreciated that by increasing the width of groove 15 in slide valve seat 5, cross-slot 19 in slide valve 3 remaining 0.033 inch wide (standard ABD/W control valve), a greater distance (a-d) is obtained, this distance being nominally 0.088 inch, through which emergency piston 2 and slide valve 3 move to define the "breathing" zone. This translates into a longer "window" period from the opening of the "breather" connection at the slide valve/seat interface until complete closure. Consequently, point (c), at which the "breathing" of quick action chamber pressure begins to become cut off, is extended.

The same effect can be achieved by increasing the width of cross-slot 19 in slide valve 3. Assuming groove 15 is 0.045 inch wide, as in the standard ABD control valve, and the increased width of slot 19 is nominally 0.043 inch, the service zone corresponds to nominally 0.088 inch piston travel. In each of the foregoing cases, this compares to a nominal piston travel of 0.078 inch in the standard ABD control valve. This will, in turn, provide an extended maximum "breathing" range (b-c). It will be understood that other relative sizes of the respective groove 15 and cross-slot 19 are also applicable, depending upon the piston travel during which it is desired to achieve maximum "breathing". While this feature of the invention is in and of itself advantageous, it further has the potential to maximize the other aspect of the invention, as will hereinafter be explained.

Figure 7:
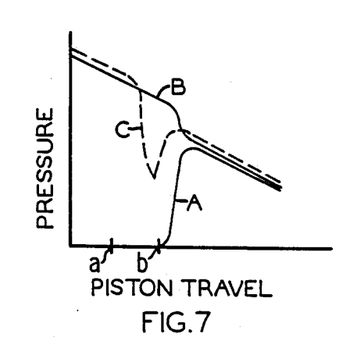
FIG. 7 is another graph plotting the emergency piston slide valve travel versus quick action chamber pressure, as achieved in accordance with another aspect of the present invention in which a volumetric chamber is provided upstream of the "breather" choke.

This other aspect of the invention is the provision of a volumetric chamber 18 that is shown in FIG. 3 as being formed in the valve body along the bore of slide valve bushing 5, so as to be in fluid communication with groove 15 at the bushing bore 5b. In placing this volumetric chamber 18 upstream of choke 23, quick action chamber pressure effective in chamber 9 acting on the underside of emergency piston 2 equalizes with volumetric chamber 18 via cross-slot 19 and groove 15 during movement of piston 2 in the maximum "breathing" range (b-c), as represented by curves A and B in the graph of FIG. 7. It will be appreciated that prior to movement of piston 2 into this maximum "breathing" range, i.e., in the range of piston travel between points (a-b), the connection between slot 19 and groove 15 at the slide valve/seat interface is more restrictive than the flow path via choke 23, so that as previously explained, during this initial movement of piston 2 into the service zone, chamber 18 is maintained at substantially atmospheric pressure. Upon sufficient movement of piston 2 beyond point (b), however, at which point the "breather" port connection becomes less restrictive than choke 23, the aforementioned equalization of pressures results in a short duration, high rate of flow of air from chamber 9 into chamber 18. As can be seen from curve B in the graph of FIG. 7, this produces a limited initial reduction of quick action chamber pressure in chamber 9 at a faster rate than would otherwise be obtained via the "breather" choke alone. Once full pressure equalization occurs, choke 23 again becomes effective to control the maximum "breathing" rate at which the quick action chamber pressure effective in chamber 9 is vented, as would normally occur without volumetric chamber 18. In this sense, curve B is seen, in the graph of FIG. 7, to track more closely with curve C representing the brake pipe pressure effective in chamber 7 acting on the upper side of emergency piston 2, particularly after a momentary brake pipe pressure reduction occurs. Accordingly, the occasions of potentially high pressure differentials arising across emergency piston 2 is diminished, as a result of momentary brake pipe pressure fluctuations being counteracted. In conjunction with the extended "breathing" range of piston and slide valve travel previously discussed relative to the one aspect of the invention, this other aspect of the invention counteracts the effect of a momentary brake pipe pressure fluctuation during a service brake application and thereby provides added assurance that an undesired emergency does not occur.

As previously mentioned, the one aspect of the invention has the potential to maximize the benefit of this latter discussed aspect of the invention, in that the increased width of groove 15 and/or cross-slot 19 provides a greater orifice area X' at the slide valve/seat interface connection between slot 19 and groove 15 in the maximum "breathing" range of piston travel (FIG. 6), as compared to the maximum orifice area X at the v/v2 interface of a standard ABD type control valve (FIG. 3). Therefore, when pressure equalization occurs between chamber 9 and volumetric chamber 18, the time required to achieve this equalization will be very short, due to the high flow capacity at the slide valve/seat interface, so as to closely correspond to the rate of change of a momentary brake pipe pressure fluctuation. Thus, in selecting the optimum width of cross-slot 19 and/or groove 15, consideration is given not only to extending the maximum "breathing" range, but also to the desired flow capacity via the slide valve/seat interface of slot 19 and groove 15 necessary to establish a rate of pressure equalization between chambers 9 and 18 that will achieve a pressure drop in chamber 9 corresponding to an opposing pressure drop in chamber 7 that would typically occur as a result of a spurious brake pipe pressure fluctuation. The foregoing criteria must also be considered in accordance with the size of volumetric chamber 18 which is critical since it determines the magnitude of the quick action chamber pressure reduction at the faster rate.

Figure 8:
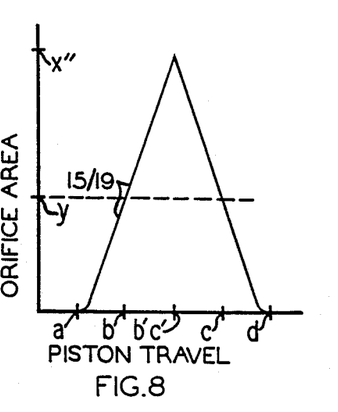
FIG. 8 is a graph similar to that of FIG. 6 illustrating the maximum "breathing" orifice area achieved by making the width of the slide valve/seat ports the same dimension.

As shown in the graph of FIG. 8, the maximum orifice area at the interface of slide valve porting 15/19, for any given travel of piston 2 in the "breathing" zone, is realized when the respective groove 15 and cross-slot 19 are the same width. For example, in keeping with the 0.088 inch "breathing" zone shown in FIG. 6, a dimension of 0.044 inch for the width of both groove 15 and cross-slot 19 will provide for a greater maximum orifice area X'' (FIG. 8), as compared to the orifice area X' when the widths of groove 15 and cross-slot 19 differ (FIG. 6). Consequently, the rate at which quick action chamber pressure is reduced during pressure equalization with chamber 18 is greatest and more closely correlated with a typical brake pipe pressure fluctuation. It has been found that a 2.0 cubic inch volumetric chamber 18 provides approximately a 1.0 psi. reduction of quick action chamber pressure at this faster rate. The most efficient utilization of volumetric chamber 18 is thus realized to counteract unintended brake pipe pressure reductions attributed to these spurious brake pipe pressure fluctuations, thereby further reducing the occasion of undesired emergency brake applications. It should be noted, at this point, that the size of volumetric chamber 18 is critical from the standpoint that too large a volume can jeopardize the ability to transmit a valid emergency brake application through the train at the very important fast rate.

It should also be noted that in the event it is desired to modify the emergency valve 1 of existing ABD type control valves to incorporate the above-discussed aspects of the invention, chamber 18 can be provided in the form of an external reservoir housing 27 adapted for mounting on the body of emergency valve device 1, as shown in FIG. 9. A central portion 28 of an adapter fitting 29 may be screw-threaded into a web 30 of the emergency valve body or, alternatively, may be press-fit in web 30. Projecting from opposite sides of central portion 28 are nipples 31 and 32 having respective seals 33 and 34. The threaded opening 35, in which the breather choke of the standard AB/D control valve is normally contained, is bored out to receive nipple 31. Similarly, reservoir body 27, containing volumetric chamber 18, is provided with a bore 37 to receive nipple 32. A through passage 38 of adapter fitting 29 establishes fluid pressure communication between chamber 18 and port 15 in slide valve bushing 5, and breather choke 23 is relocated in a passage 39 of adapter fitting 29 that connects passage 38 to atmosphere. The reservoir body 27 is held in place on nipple 32 by a mounting bolt 40 that clamps a projecting lug 41 of body 27 against the inshot valve cover 42 of the AB/D control valve device.

While it will be appreciated that maximum emergency piston stability against undesired emergencies can be achieved by the combined effect of the different aspects of the present invention, either one of these aspects of the invention may be employed independently of the other to achieve improved stability of the emergency piston during service brake applications, although with less impact than the combined effect provides.

In the event the brake pipe pressure reduction is occurring at a sustained emergency rate, consistent with a valid initiation of an emergency brake application, the venting of quick action chamber pressure via breather choke 23 in the maximum "breathing" range of travel of emergency piston 2 is insufficient to overcome a sustained upward acting pressure differential across the emergency piston. Accordingly, piston 2 continues to be forced upwardly from the "breathing" zone to emergency position in which cross-slot 19 in slide valve 3 is moved beyond groove 15 in the slide valve seat and out of communication therewith to terminate the quick action chamber "breathing" function. At substantially the same time, slide valve slot 20 uncovers groove 16 in the slide valve seat to connect quick action chamber pressure from area 17 and recess 13 to passage 26. In a well-known manner, pressurization of passage 26 results to effect an emergency brake application.

We claim:
1. An emergency valve device comprising:
 (a) a body portion having a first bore;
 (b) an emergency piston movable in said body portion between a release position and an emergency position;
 (c) a fluid flow path via which fluid under pressure in a quick action chamber is vented during movement of said emergency piston in a "breathing" zone intermediate said release and emergency positions in response to a pressure differential across said emergency piston due to the reduction of fluid pressure in a brake pipe acting on one side of said piston relative to the fluid pressure in side quick action chamber acting on the other side thereof;
 (d) valve means for controlling the venting of said quick action chamber fluid under pressure via said flow path comprising:
 (i) a slide valve carried by said emergency piston on said other side thereof so as to be movable therewith, said slide valve being formed with a first passage that extends across the face of said slide valve in a direction lateral to the direction of travel of said piston to conduct said quick action chamber fluid under pressure to the face of said slide valve; and
 (ii) a slide valve seat fixed in said first bore, the face of said seat being engageable with the face of said slide valve and being formed with a second passage that extends laterally theracross relative to the direction of travel of said piston, said second passage communicating with said first bore, said flow path including said first and second passages, the opening between said first and second passages at the interface of said slide valve and said seat varying with travel of said emergency piston in said "breathing" zone to control the rate at which said quick action chamber fluid under pressure is vented via said flow path; and (e) choke means in said flow path for establishing a maximum rate of venting said quick action chamber fluid under pressure, said maximum rate being chosen to adjust said pressure differential and thereby stabilize said emergency piston against movement to said emergency position, except when said reduction of said brake pipe fluid under pressure occurs at an emergency rate that exceeds said service rate, said "breathing" zone being between 0.082–0.106 inch, said maximum rate of venting said quick action chamber occurring during movement of said emergency piston in a maximum "breathing" range of said "breathing" zone, said maximum "breathing" range being such that a spurious reduction of said brake pipe fluid under pressure at said emergency rate is dissipated prior to said movement of said emergency piston beyond said maximum "breathing" range in the direction of said emergency position, thereby preventing an undesired emergency brake application.

2. An emergency valve device, as recited in claim 1, further characterized in that the dimensions of said first and second passages are equal in the direction of movement of said piston.

3. An emergency valve device, as recited in claim 2, wherein the dimension of said first and second passages is substantially 0.044 inch in the direction of movement of said piston.

4. An emergency valve device, as recited in claim 1, further characterized in that the dimensions of said first and second passages are unequal in the direction of movement of said piston.

5. An emergency valve device, as recited in claim 1, wherein the dimension of said first passage is substantially 0.033 inch in the direction of movement of said piston.

6. An emergency valve device, as recited in claim 5, wherein the dimension of said second passage is substantially 0.055 inch in the direction of movement of said piston.

7. An emergency valve device, as recited in claim 1, wherein the flow capacity provided by said choke means is less than the maximum flow capacity of said first and second passages at said interface therebetween.

8. An emergency valve device, as recited in claim 1, further comprising a volumetric chamber in said flow path upstream of said choke means into which fluid under pressure flows from said quick action chamber when a pressure differential exists therebetween during said movement of said emergency piston in said service zone, the maximum capacity of said flow path upstream of said choke means and the size of said volumetric chamber being such that said flow of fluid under pressure into said volumetric chamber effects a greater rate of reduction of said quick action chamber fluid under pressure than provided by the maximum rate of reduction thereof effective via said breather choke.

9. An emergency valve device, as recited in claim 8, wherein the capacity of said volumetric chamber is greater than 1.0 cubic inch.

10. An emergency valve device, as recited in claim 8, wherein the capacity of said volumetric chamber is substantially 2.3 cubic inch.

11. An emergency valve device, as recited in claim 1, further comprising:

(a) an adapter fitting having first and second nipples projecting in opposite directions from an intermediate portion, said intermediate portion being secured in said body portion of said emergency valve device;

(b) said flow path further including:
    (i) a second bore in said body portion communicated with said first bore, said first nipple projecting into said second bore;
    (ii) a third passage extending through said adapter fitting between said first and second nipples; and
    (iii) a fourth passage in said adapter fitting connecting said third passage to atmosphere, said fourth passage having said choke means; and (c) a reservoir housing secured to said body portion, said housing having a cavity providing said volumetric chamber;

(d) a second bore into which said second nipple projects, said second bore being formed in said reservoir housing so as to open into said cavity; and (e) first and second seal means for sealing said first and second nipples in said first and second bores, respectively.

12. An emergency valve device comprising:

(a) a body portion having a first bore;

(b) an emergency piston movable in said body portion between a release position and an emergency position;

(c) a fluid flow path via which fluid under pressure in a quick action chamber is vented during movement of said emergency piston in a "breathing" zone intermediate said release and emergency positions in response to a pressure differential across said emergency piston due to the reduction of fluid pressure in a brake pipe acting on one side of said piston relative to the fluid pressure in said quick action chamber acting on the other side thereof;

(d) valve means for controlling the venting of said quick action chamber fluid under pressure via said flow path comprising:
    (i) a slide valve carried by said emergency piston on said other side thereof so as to be movable therewith, said slide valve being formed with a first passage that extends across the face of said slide valve in a direction lateral to the direction of travel of said piston to conduct said quick action chamber fluid under pressure to the face of said slide valve; and
    (ii) a slide valve seat fixed in said first bore, the face of said seat being engageable with the face of said slide valve and being formed with a second passage that extends laterally thereacross relative to the direction of travel of said piston, said second passage communicating with said first bore, said flow path including said first and second passages, the opening between said first and second passages at the interface of said slide valve and said seat varying with travel of said emergency piston in said "breathing" zone to control the rate at which said quick action chamber fluid under pressure is vented via said flow path; and (e) a breather choke in said flow path via which said venting of said quick action chamber fluid under pressure is limited to a maximum rate generally sufficient to adjust said pressure differential and thereby stabilize said emergency piston against movement to said emergency position, except when said reduction of said brake pipe fluid under pressure occurs at an emergency rate that exceeds said service rate; and (f) a volumetric chamber to which said flow path is connected having a capacity greater than 1.0 cubic inch to effect said reduction of said quick action fluid under pressure at a rate that momentarily exceeds said service rate and accordingly counteracts a spurious reduction of said brake pipe fluid under pressure at said emergency rate, whereby said emergency piston is stabilized against movement to emergency position, thereby preventing an undesired emergency brake application.

13. An emergency valve device, as recited in claim 12, further characterized in that the dimensions of said first and second passages are equal in the direction of movement of said piston.

14. An emergency valve device, as recited in claim 13, wherein said service zone is between 0.082 and 0.106 inch.

15. An emergency valve device, as recited in claim 14, wherein the dimension of said first and second passages is substantially 0.044 inch in the direction of movement of said piston.

16. An emergency valve device, as recited in claim 15, wherein the size of said volumetric chamber is substantially 2.3 cubic inch.

17. An emergency valve device, as recited in claim 12, further comprising:

(a) an adapter fitting having first and second nipples projecting in opposite directions from an intermediate portion, said intermediate portion being secured in said body portion of said emergency valve device;

(b) said flow path further including:
  (i) a second bore in said body portion communicated with said first bore, said first nipple projecting into said second bore;
  (ii) a third passage extending through said adapter fitting between said first and second nipples; and
  (iii) a fourth passage in said adapter fitting connecting said third passage to atmosphere, said fourth passage having said choke means; and (c) a reservoir housing secured to said body portion, said housing having a cavity providing said volumetric chamber;

(d) a second bore into which said second nipple projects, said second bore being formed in said reservoir housing so as to open into said cavity; and (e) first and second seal means for sealing said first and second nipples in said first and second bores, respectively.

* * * * *

UNITED STATES PATENT AND TRADEMARK OFFICE
CERTIFICATE OF CORRECTION

PATENT NO. : 4,830,438

DATED : May 16, 1989

INVENTOR(S) : James E. Hart and Edward W. Gaughan

It is certified that error appears in the above-identified patent and that said Letters Patent is hereby corrected as shown below:

Column 11, line 58, delete "service" and insert --breathing--

Column 12, line 23, delete "second", first occurrence, and insert --third-- line 24, delete "second" and insert --third-- line 27, delete "first" and insert --second-- same line, delete "second", second occurrence, and insert --third-- line 39, delete "the" and insert --a service rate of--

Column 13, line 14, delete "service" and insert --maximum-- line 25, delete "service" and insert --breathing--

Column 14, line 25, delete "second", first occurence, and insert --third-- line 26, delete "second" and insert --third--

UNITED STATES PATENT AND TRADEMARK OFFICE
CERTIFICATE OF CORRECTION

PATENT NO. : 4,830,438

DATED : May 16, 1989

INVENTOR(S) : James E. Hart and Edward W. Gaughan

It is certified that error appears in the above-identified patent and that said Letters Patent is hereby corrected as shown below:

Column 14, line 29, delete "first" and insert --second-- same line, delete "second", second occurrence, and insert --third--

Signed and Sealed this

Thirty-first Day of July, 1990

Attest:

HARRY F. MANBECK, JR.

Attesting Officer

Commissioner of Patents and Trademarks